(12) United States Patent
Jensen et al.

(10) Patent No.: US 11,403,158 B2
(45) Date of Patent: Aug. 2, 2022

(54) DISCRETE LOGIC SAFETY SYSTEMS FOR SMART PROCESS CONTROL DEVICES

(71) Applicant: FISHER CONTROLS INTERNATIONAL LLC, Marshalltown, IA (US)

(72) Inventors: Kurtis Jensen, Marshalltown, IA (US); William Sean Raymond, Toledo, IA (US); Eric Strong, Marshalltown, IA (US); Greg Jacobs, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/937,300

(22) Filed: Jul. 23, 2020

(65) Prior Publication Data

US 2022/0027224 A1 Jan. 27, 2022

(51) Int. Cl.
| | | |
|---|---|---|
| *G06F 11/07* | (2006.01) | |
| *H04L 43/10* | (2022.01) | |
| *G06F 11/20* | (2006.01) | |
| *G06F 9/30* | (2018.01) | |

(52) U.S. Cl.
CPC ...... *G06F 11/0724* (2013.01); *G06F 9/30029* (2013.01); *G06F 11/0772* (2013.01); *G06F 11/2028* (2013.01); *H04L 43/10* (2013.01)

(58) Field of Classification Search
CPC ............. G06F 11/0724; G06F 9/30029; G06F 11/0772; G06F 11/2028; H04L 43/10
See application file for complete search history.

(56) References Cited

U.S. PATENT DOCUMENTS

| | | | | |
|---|---|---|---|---|
| 6,647,301 | B1* | 11/2003 | Sederlund | G06F 11/1633 714/E11.017 |
| 10,025,682 | B2* | 7/2018 | Katou | G06F 11/2028 |
| 11,010,175 | B2* | 5/2021 | Pontes | G06F 11/0757 |
| 2005/0113942 | A1* | 5/2005 | Longsdorf | G05B 19/0425 700/79 |
| 2006/0056285 | A1* | 3/2006 | Krajewski | G06F 11/2028 370/216 |
| 2006/0069946 | A1* | 3/2006 | Krajewski | G06F 11/2028 714/4.1 |
| 2008/0183306 | A1* | 7/2008 | Ashraf | B61L 29/22 246/125 |

(Continued)

FOREIGN PATENT DOCUMENTS

| | | | | |
|---|---|---|---|---|
| EP | 3731034 A1 * | 10/2020 | ......... | F16K 37/0075 |
| WO | WO-2021058471 A * | 4/2021 | ......... | F16K 37/0075 |

*Primary Examiner* — Matthew M Kim
*Assistant Examiner* — Indranil Chowdhury
(74) *Attorney, Agent, or Firm* — Hanley, Flight & Zimmerman, LLC

(57) ABSTRACT

Discrete logic safety systems for smart process control devices are disclosed. A discrete logic safety system includes a heartbeat monitor to be operatively coupled to a processor of the process control device to monitor a first condition of the processor, a sensor monitor to be operatively coupled to a sensor of the process control device to monitor a second condition of the sensor, and first discrete logic operatively couple to the heartbeat monitor and the sensor monitor to generate a failure indication associated with the process control device based on the first condition or the second condition.

23 Claims, 3 Drawing Sheets

(56) References Cited

U.S. PATENT DOCUMENTS

| | | | |
|---|---|---|---|
| 2009/0062933 A1* | 3/2009 | Eryurek | G05B 23/0272 |
| | | | 700/12 |
| 2015/0088434 A1* | 3/2015 | Grabau | G01N 25/00 |
| | | | 702/34 |
| 2016/0283426 A1* | 9/2016 | Yang | G06F 11/2092 |
| 2016/0350193 A1* | 12/2016 | Katou | G06F 11/2028 |
| 2018/0314575 A1* | 11/2018 | Mesic | G06F 11/0757 |
| 2019/0294125 A1* | 9/2019 | Deka | G05B 9/02 |
| 2019/0324796 A1* | 10/2019 | Standley | G06F 11/3409 |
| 2020/0026598 A1* | 1/2020 | Boschi | G06F 11/0739 |
| 2021/0105198 A1* | 4/2021 | Pandey | H04L 43/0847 |
| 2021/0382536 A1* | 12/2021 | Ivanchenko | G06F 1/30 |

* cited by examiner

DISCRETE LOGIC SAFETY SYSTEMS FOR SMART PROCESS CONTROL DEVICES

FIELD OF THE DISCLOSURE

This disclosure relates generally to safety systems and, more particularly, to discrete logic safety systems for smart process control devices.

BACKGROUND

In recent years, smart process control devices containing a processor and firmware have obtained Safety Integrity Level (SIL) safety certification using a Type B classification. The Type B classification requires a thorough analysis of software, electronic designs, and development processes. Certification of a Type B system is required when a processor or sensor is installed or replaced in a smart process control device. In contrast, certification for Type A safety instrumented systems requires less time and effort but has been reserved for simple, non-smart devices for which an abundance of field failure data is available.

SUMMARY

An example apparatus for indicating a failure of a process control device includes a heartbeat monitor to be operatively coupled to a processor of the process control device to monitor a first condition of a processor. The example apparatus also includes a sensor monitor to be operatively coupled to a sensor of the process control device to monitor a second condition of the sensor. Discrete logic is operatively coupled to the heartbeat monitor and the sensor monitor to generate a failure indication associated with the process control device based on the first condition or the second condition.

An example method for indicating a failure of a process control device includes monitoring, via a heartbeat monitor, a first condition of a processor associated with the process control device and monitoring, via a sensor monitor, a second condition of a sensor associated with the process control device. The example method further includes detecting, via a first discrete logic, a failure of the processor or the sensor based on the first condition and the second condition and indicating the failure of the processor or the sensor.

An example apparatus to indicate a failure of a process control device includes first means for monitoring to identify a first condition of a processor of the process control device and second means for monitoring to identify a second condition of a sensor of the process control device. The example apparatus further includes means for identifying a failure based on the first condition or the second condition and means for indicating to, when the first condition or the second is not met, halt at least one function of the process control device.

Figure 1:
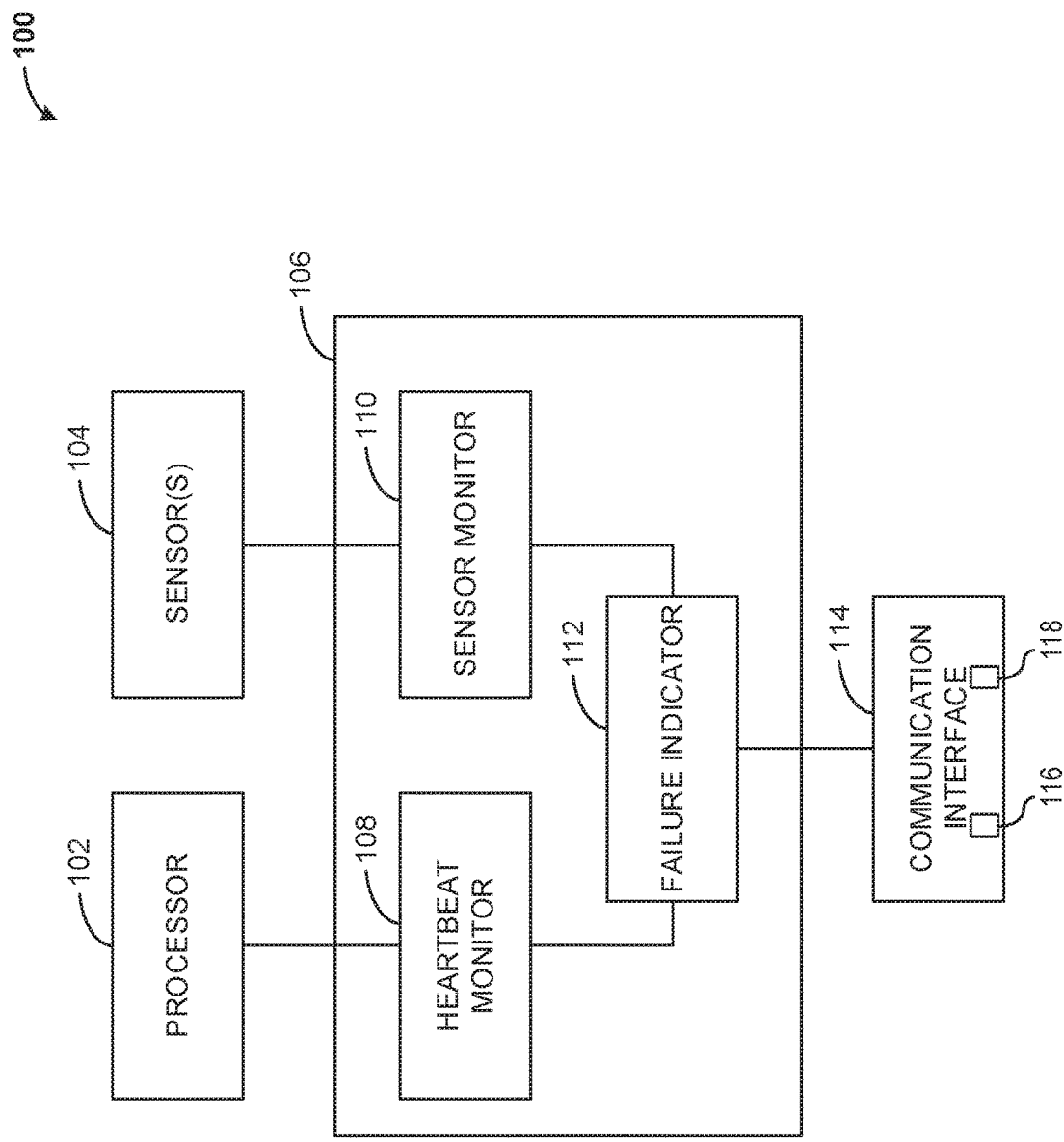
FIG. 1 is a block diagram of an example discrete logic safety system for a smart process control device in accordance with the teachings herein.

In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Process control systems, like those used in chemical, petroleum, or other processes, require SIL safety certifications in accordance with the requirements of IEC (International Electrotechnical Commission) 61508. In known implementations, process control systems containing a controller that includes a processor and firmware are considered smart devices, which obtain SIL certification using a Type B classification. The Type B classification requires a thorough analysis and proof of development processes to demonstrate an outcome when a component of a device fails. In particular, the Type B classification requires re-certification of a device when any processor, sensor, or firmware is replaced.

Alternatively, an SIL Type A classification is typically used for devices not containing a controller that includes a processor and firmware. An important difference between Type A devices and Type B devices is the level of confidence in understanding the failure mode of the components of a device. The level of confidence associated with understanding the failure modes of a device is based on a theoretical analysis of the device and the correlation of the theoretical analysis to actual field failure data associated with the device. In general, there is a higher confidence associated with the reliability of Type A devices than Type B devices because more conclusive field failure data can be collected for Type A devices. Specifically, with a Type A device, field failure data for the Type A device more accurately identifies the components contributing to a failure of the device. As a result, the field failure data for a Type A device can be more reliably used to confirm the theoretical analysis of the components of the Type A device.

When a failure occurs in a Type A device, field failure data is produced by directly (e.g., manually) analyzing the components of the device and determining a root cause associated with the failure. Type A devices are usually mechanical devices with simple analog circuits and, thus, the analysis of a Type A device typically requires an actor (e.g., a machine, a machine operator, etc.) to identify which mechanical component(s) within the device malfunctioned and caused the failure.

In contrast, when a failure occurs within a Type B device, the root cause of the failure cannot easily be attributed to a component of the device because complex components of the device are in communication with one another and, thus, the origin of the failure may be unclear. The resultant field failure data associated with the Type B device may then be characterized as inconclusive as it is less indicative of the component that caused the failure to occur. The inconclusive failure cannot be used in comparisons between field failure data and theoretical analyses and, thus, a confidence in the reliability of Type B devices is typically substantially lower than that of Type A devices.

Examples disclosed herein enable a smart process control device to produce field failure data that can be compared to a theoretical analysis of the smart process control device. Based on the confidence level of the field failure data associated with the smart process control device, the device may then obtain a Type A SIL certification, thereby eliminating the recertification requirement if a component of the device were to be replaced.

More specifically, the examples disclosed herein provide discrete logic safety systems for smart process control devices. Examples disclosed herein include devices that enable discrete logic to detect a failure in a smart process control device without relying on the functionality of a processor or firmware. In this manner, examples disclosed herein enable smart process control devices to acquire more conclusive field failure data (e.g., indicative of the component(s) that caused a failure to occur) than smart process control devices without discrete logic safety systems and, thus, advantageously enable SIL certification of smart process control devices using the Type A classification.

Examples disclosed herein include discrete logic in communication with components of a smart process control device to detect a failure associated with one or more of the components. The example discrete logic includes monitors to verify the states of components in the device based on defined safety parameters (e.g., a voltage range, a frequency, etc.). Particularly, the discrete logic includes monitors to be operationally (e.g., electrically) coupled to a processor(s) and a sensor(s) of a system (e.g., a smart process control device) to monitor the defined safety parameters associated with the processor(s) and the sensor(s). In some disclosed examples, the processor(s) and the sensor(s) are implemented within a controller of the smart process control device.

In some disclosed examples, a heartbeat monitor detects a frequency of a signal produced by the processor(s) of a smart process control device over a period of time and a sensor monitor detects an output signal of the sensor(s) (e.g., a voltage) of the smart process control device. In some examples, the heartbeat monitor and the sensor monitor are implemented using logic gates (e.g., AND gates, OR gates, NOT gates, NAND gates, NOR gates, EXOR gates, and/or EXNOR gates) in addition to other electrical components. Further, the heartbeat monitor and the sensor monitor determine if the signals from the processor(s) and the sensor(s) are within defined limits. In some examples, if a frequency of the signal produced by the processor is too low and/or if the output voltage from the sensor is too high, a failure indicator transmits a failure indication (e.g., an analog signal, a digital signal, etc.). In some examples, at least one function of the smart process control device may be halted when a failure is detected (e.g., in response to the failure indication). In some such examples, the smart process control device reinitiates the at least one function in response to the failed processor and/or sensor being replaced.

FIG. 1 is a block diagram of an example discrete logic safety system 106 for a smart process control device 100 in accordance with the teachings herein. In the illustrated example, the smart process control device 100 includes a processor 102, a sensor(s) (e.g., a sensor and associated circuitry) 104, and a communication interface 114. The discrete logic safety system 106 includes a heartbeat monitor 108, a sensor monitor 110, and a failure indicator 112. As described in more detail below, any or all of the heartbeat monitor 108, the sensor monitor 110, and the failure indicator 112 may be implemented using discrete logic. For example, the failure indicator 112 may be implemented using first discrete logic and the heartbeat monitor 108 and/or the sensor monitor 110 may be implemented using second discrete logic operatively coupled to the first discrete logic. As used herein, the term "discrete logic" means electrical components such as logic gates, transistors, passive components, etc. that do not include a processor for executing instructions.

As illustrated in FIG. 1, the heartbeat monitor 108 of the discrete logic safety system 106 is operatively coupled to the processor 102 and the sensor monitor 110 is operatively coupled to the sensor(s) 104. In some other examples, the smart process control device 100 includes a plurality of the processor 102 and the sensor(s) 104, which are operatively coupled to respective additional ones of the heartbeat monitor 108 and the sensor monitor 110. In the illustrated example, the heartbeat monitor 108 and the sensor monitor 110 are in communication with the failure indicator 112. Alternatively, the heartbeat monitor 108 and the sensor monitor 110 may be in communication with respective separate ones of the failure indicator 112.

In general, the heartbeat monitor 108 monitors a first condition, such as an operational status, of the processor 102 and provides information relating to the first condition (or operational status of the processor 102) to the failure indicator 112. Similarly, the sensor monitor 110 monitors a second condition, such as an operational status, of the sensor(s) 104 and provides information relating to the second condition (or operational status of the sensor(s) 104) to the failure indicator 112.

More specifically, in operation, the processor 102 provides a periodic signal (e.g., a digital signal, a pulse wave, etc.) having a predetermined frequency (e.g., 0.5 Hz., 1.0 Hz., 2.0 Hz., etc.) to the heartbeat monitor 108. The heartbeat monitor 108 determines if transitions of the periodic signal is (e.g., the pulses) are received within a threshold time limit (e.g., 0.5 sec., 1.0 sec., 2.0 sec.). The threshold time limit is based on the predetermined frequency of the signal. In some examples, a timer implements the threshold time limit (e.g., a 0.5 second timer, a 1.0 second timer, a 2.0 second timer, etc.). For example, if the frequency of the signal from the processor 102 is 1.0 Hz. (e.g., 1 pulse per second), the heartbeat monitor 108 includes a 1.0 second timer. Thus, if the heartbeat monitor 108 does not receive the signal before or when the timer expires, the heartbeat monitor communicates (e.g., via a digital signal, via an analog signal, etc.) to the failure indicator 112 that a failure of the processor 102 has occurred. In some examples, a tolerance (e.g., an additional 0.1 sec.) is allotted by the timer of the heartbeat monitor 108 to allow the heartbeat signal from the processor 102 to have a relatively small deviation from the expected predetermined frequency.

The example sensor monitor 110 of the smart process control device 100 analyzes an output of the sensor(s) 104 to verify that the sensor(s) 104 is operating within predetermined normal operating conditions (e.g., a predetermined normal output voltage, a predetermined normal output current, etc.). In the illustrated example, the sensor(s) 104 is a position sensor, and associated hardware, that monitors the position of a moving component (e.g., a valve, an actuator, etc.) of the smart process control device 100. In other examples, the sensor(s) 104 is an alternative process measurement sensor (e.g., an optical sensor, a pressure gauge, a thermometer, etc.). In some such examples, the process control device 100 is a process transmitter that measures and/or monitors a temperature, level, and/or flow through associated pipes and/or vessels. In some examples, the sensor monitor 110 includes thresholds (e.g., a high voltage threshold, a low voltage threshold, etc.,) to which the output of the sensor(s) 104 is compared. If the output of the sensor(s) 104 includes a voltage that is higher than the high voltage threshold, or lower than the low voltage threshold, the sensor monitor 110 communicates (e.g., via a digital signal, via an analog signal, etc.) to the failure indicator 112 that the sensor is not operating within the predetermined normal operating conditions and, thus, a failure has occurred.

Figure 2:
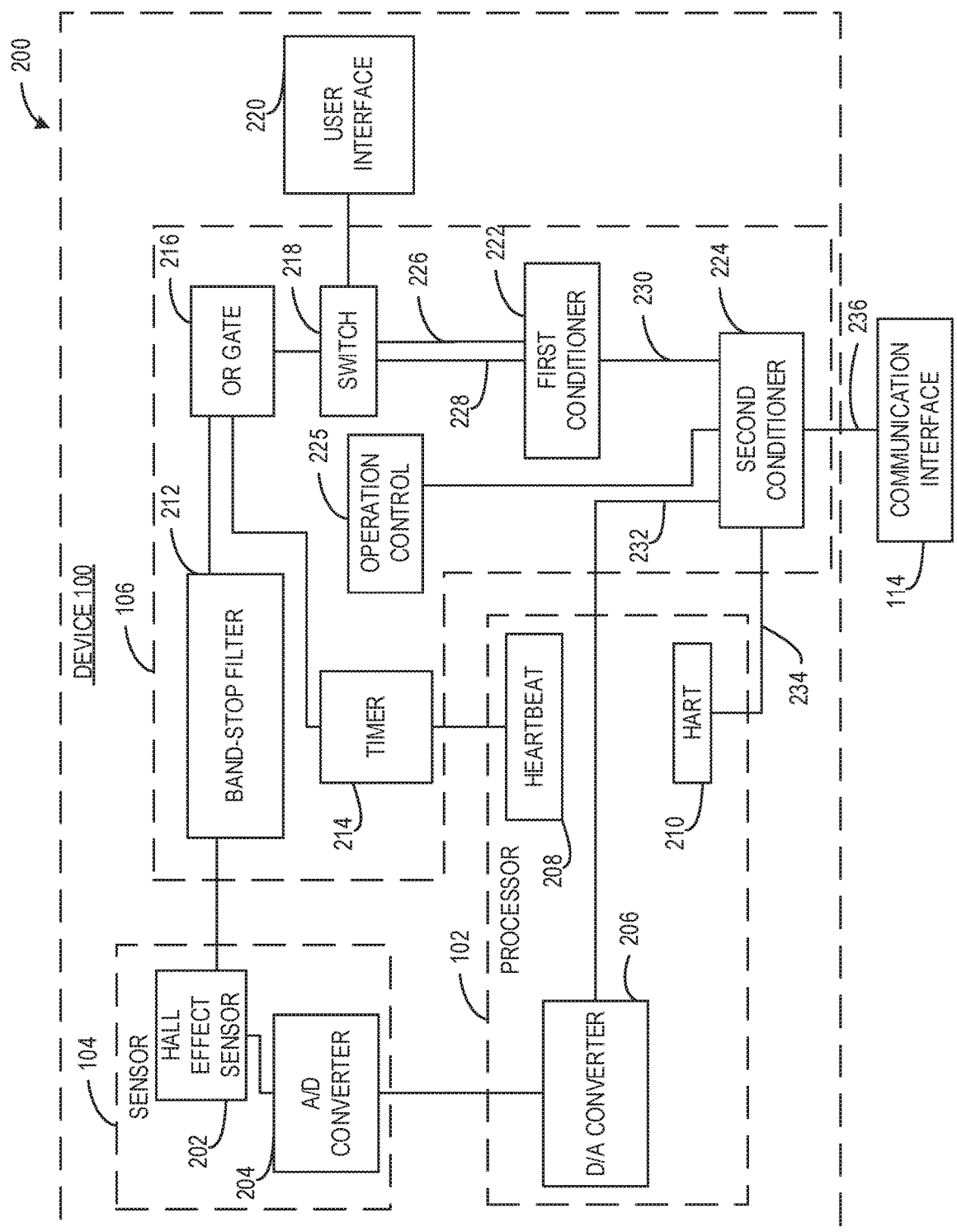
FIG. 2 is a block diagram of an example circuit implementing the discrete logic safety system of FIG. 1.

In some examples, the failure indicator 112 includes one or more logic gates such as an OR gate, a switch, and one or more signal conditioners to evaluate the signals (e.g., indicative of respective first and second conditions) received from the heartbeat monitor 108 and the sensor monitor 110 to generate a failure indication based on the signals (or first and second conditions), as discussed in association with FIG. 2.

Furthermore, after the heartbeat monitor 108, or the sensor monitor 110, communicates an operational status indicative of a failure of one or both of the processor 102 and sensor(s) 104 to the failure indicator 112, the failure indicator 112 sends a failure indication signal (e.g., an analog signal, a digital signal, etc.) to the communication interface 114. In some examples, the failure indicator 112 replaces (e.g., overrides) any operational status indication signals that may be provided directly by the processor 102 or the sensor(s) 104. In other words, the failure indicator 112, and the heartbeat monitor 108 and the sensor monitor 110 to which the failure indicator 112 is operatively coupled (collectively the discrete logic safety system 106) are configured to bypass any status indicators or information provided directly by the processor 102 and the sensor(s) 104.

Additionally or alternatively, the failure indicator 112 indicates, via a signal parameter (e.g., a voltage, a frequency, a current, etc.), to the communication interface 114 if the failure originated from the processor 102 and/or the sensor(s) 104. In some examples, the communication interface 114 includes visual indicators 116, 118 (e.g., light-emitting diodes (LEDs)) that activate (e.g., illuminate) in response to the communication interface 114 receiving the failure indication signal. One of the visual indicators 116, 118 may indicate (by illuminating) a failure condition associated with the processor(s) 102 and the other one of the visual indicators 116, 118 may indicate a failure condition associated with the sensor(s) 104. In some examples, the smart process control device 100 halts at least one function (e.g., powers down) in response to the failure indication signal. In some such examples, the smart process control device 100 reinitiates operations (e.g., powers on) in response to the processor 102 and/or sensor 104 being replaced. In other examples, the components of the discrete logic safety system 106 are in communication with a storage unit (e.g., a database). In some such examples, an actor (e.g., a machine, a machine operator, etc.) extracts data from the storage unit after the failure occurs to determine a root cause of the failure.

FIG. 2 is a block diagram of an example circuit 200 implementing the discrete logic safety system 106 of FIG. 1. The example circuit 200 includes the processor 102, the sensor(s) 104, the discrete logic safety system 106, and the communication interface 114 of FIG. 1.

As shown in the example of FIG. 2, the sensor(s) 104 includes a Hall effect sensor 202 and an analog-to-digital (A/D) converter 204, the processor 102 includes digital-to-analog (D/A) converter 206, a heartbeat signal generator 208, and a Highway Addressable Remote Transducer (HART) 210. The discrete logic safety system 106 includes a band-stop filter (e.g., a band-reject filter, a voltage-controlled filter, etc.) 212, a timer 214, an OR gate 216, a switch 218, a first conditioner 222, a second conditioner 224, and an operation control 225. Further, as shown in FIG. 2, a user interface 220 may be operatively coupled to the discrete logic safety system 106.

In the example of FIG. 2, the band-stop filter 212 implements the sensor monitor 110 of FIG. 1, the timer 214 implements the heartbeat monitor 108 of FIG. 1, and the OR gate 216, the switch 218 and the conditioners 222, 224 implement the failure indicator 112 of FIG. 1. However, it should be understood that other implementations of the blocks of FIG. 1 may be used to suit the needs of a particular application in accordance with the teachings herein. For example, the heartbeat monitor 108, the sensor monitor 110, and/or the failure indicator 112 can be implemented by alternative logic gates, such as an AND gate, a NOT gate, a NAND gate, a NOR gate, an EXOR gate, and/or an EXNOR gate, depending on the operating conditions of the smart process control device 100.

Now turning in detail to FIG. 2, in the example circuit 200 the Hall effect sensor 202 is in communication with the A/D converter 204 and the example discrete logic safety system 106. In some examples, the Hall effect sensor 202 determines a position of a moving component of the smart process control device 100 (e.g., a stem or shaft of a valve or other end operator) via a magnet(s) coupled to the moving component. The Hall effect sensor 202 senses a magnetic field proportional to a strength of the magnet(s), a distance from the magnet(s) to the Hall effect sensor 202, or a rotation of a single magnet thus changing the flux intensity sensed by the Hall effect sensor 202. The Hall effect sensor 202 sends an analog signal, proportional to the sensed magnetic field, to the discrete logic safety system 106 and the A/D converter 204. In some such examples, when the smart process control device 100 is operating within predetermined normal operating conditions, the magnet(s) coupled to the moving component is within a predetermined normal operating position range and the resultant analog signal from the Hall effect sensor 202 is within a predetermined normal operating signal range (e.g., a voltage range, a current range, etc.).

Additionally, the A/D converter 204 of the sensor 104 converts the analog signal from the Hall effect sensor 202 to a digital signal and communicates raw digital counts to the processor 102. In general, when the smart process control device 100 is operating within predetermined normal operating conditions, the raw counts from the A/D converter 204 are within a predetermined normal operating raw count range. In some examples, the processor 102 determines an actual position (e.g., a distance from a home position, a distance from the Hall effect sensor 202, etc.) of the moving component of the smart process control device 100 based on the raw counts provided by the A/D converter 204.

In some examples, the processor 102 is in communication with the sensor 104 and the discrete logic safety system 106. In some examples, the D/A converter 206 of the processor 102 receives the raw counts from the sensor 104 and converts the raw counts (i.e., the digital signal) to an analog signal. Specifically, when the raw counts are within the predetermined normal operating raw count range, the analog signal from the D/A converter 206 is within a predetermined normal operating signal range (e.g., a voltage range, a current range, a frequency range, etc.). In contrast, if the raw counts are not within the predetermined normal operating raw count range, a parameter (e.g., a current, a voltage, a frequency, etc.) of the analog signal from the D/A converter 206 is outside the predetermined normal operating signal range. For example, if the raw counts from the sensor 104 are higher than the predetermined normal operating raw count range, a resultant voltage from the D/A converter 206 is higher than a predetermined normal operating voltage range. The processor 102 communicates the resultant analog signal to the discrete logic safety system 106.

In some examples, the processor 102 includes the heartbeat signal generator 208 operatively coupled to the discrete logic safety system 106. In some examples, the heartbeat signal generator 208 sends a pulse signal (e.g., a two state or digital signal) to the discrete logic safety system 106 at a predetermined normal operating frequency (e.g., 1 Hz, one pulse signal per second). In alternative examples, the heartbeat signal generator 208 sends a signal other than the pulse signal, such as an analog signal with a predetermined normal operating frequency (e.g., 1.0 Hz., 2.0 Hz, etc.). In some such examples, when the smart process control device 100 is operating within predetermined normal operating conditions, the heartbeat signal generator 208 provides the pulse signal to the discrete logic safety system 106 at the predetermined normal operating frequency.

Additionally, in some examples, the HART 210 of the processor 102 is operatively coupled to the discrete logic safety system 106. In some examples, the HART 210 operates in a point-to-point mode where digital signals are overlaid on a 4-20 mA loop current. For example, the HART 210 communicates a first status via the 4-20 mA loop current and communicates a second status with a digital signal over the same communication path (e.g., wires). In this example, the HART 210 sends a 4-20 mA signal to the discrete logic safety system 106 when the HART 210 is operating within predetermined normal operating conditions.

In the illustrated example, the discrete logic safety system 106 includes the band-stop filter 212 to determine if the sensor 104 is operating within predetermined normal operating conditions. In some examples, the band-stop filter 212 implements a high signal threshold (e.g., a high voltage threshold, a high frequency threshold, etc.) and a low signal threshold (e.g., a low voltage threshold, a low frequency threshold, etc.). In some examples, the band-stop filter 212 is voltage-controlled and attenuates signals between the low voltage threshold (e.g., 40 mV) and the high voltage threshold (e.g., 470 mV) to indicate that the signal from the sensor 104 of the smart process control device 100 is within the predetermined normal operating signal range. In some such examples, the band-stop filter 212 outputs a low voltage signal (e.g., a logical zero) to the OR gate 216 when the signal from the sensor 104 falls between the low and high signal thresholds to indicate normal operation of the sensor 104.

In some examples, if a voltage of the signal from the Hall effect sensor 202 is higher than the high voltage threshold, or lower than the low voltage threshold, the moving component of the smart process control device 100 is not within the predetermined normal operating position range. In some such examples, the band-stop filter 212 outputs a high voltage signal (e.g., a logical one) to the OR gate 216 to indicate a failure associated with the smart process control device 100. In alternative examples, one or more of an OR gate, a NAND gate, or an EXOR gate is used in place of the band-stop filter 212. In some such examples, the OR gate, or the EXOR gate, determines if the voltage of the signal from the sensor 104 is higher than the high voltage threshold or lower than the low voltage threshold and outputs a high voltage (e.g., a logical one) to the OR gate 216 if either condition is satisfied. Additionally, in some such examples, the NAND gate determines if the voltage of the signal from the sensor 104 is higher than the low voltage threshold and not higher than the high voltage threshold, or lower than the high voltage threshold and not lower than the low voltage threshold.

In some examples the processor 102 is in communication with the timer 214 of the discrete logic safety system 106. In some such examples, the processor 102 sends a pulse signal (e.g., a digital signal) to the timer 214, which is a one second timer in this example, at a frequency of less than 1 Hz. In some such examples, the discrete logic safety system 106 implements the timer 214 as a 1 second timer that outputs a high voltage signal (e.g., a logical one) when the 1 second timer expires. Alternatively, in some such examples, the timer 214 resets in response to detecting the pulse signal from the heartbeat signal generator 208 before the 1 second timer expires. Thus, while the heartbeat signal generator 208 continues to provide reset pulses to the timer 214, the output of the timer 214 remains at a low voltage (e.g., logical zero). Further, if the processor 102 fails, the heartbeat signal generator 208 ceases providing reset pulses to the timer 214 and the timer 214 provides the high voltage signal or logical one to the OR gate 126 to indicate the failure associated with the processor 102.

In the illustrated example, if the OR gate 216 receives the high voltage signal (e.g., logical one) indicating the failure associated with the smart process control device 100 from the band-stop filter 212 or the timer 214, the OR gate 216 outputs a high voltage signal (e.g., logical one) to the switch 218. The switch 218 routes the output of the OR gate 216 to one of first and second inputs 226, 228 to the first conditioner 222. The position of the switch 218 (i.e., the one of the inputs 226, 228 to which the output of the OR gate 216 is routed) may be controlled via the user interface 220. The setting of the position may be implemented via an electronic selection and/or via a mechanical device (e.g., a jumper wire or connector).

The first conditioner 222 converts a logical one or high voltage signal from the OR gate 216, which is indicative of a failure of the sensor 104 and/or the processor 102, to a low or high current signal. For example, when the switch 218 is configured to route the output of the OR gate 216 to the first input 226 of the first conditioner 222, the first conditioner 222 generates a high current signal (e.g., 21.5 mA) at an output 230 when the OR gate 216 outputs a logical one or high voltage signal. Alternatively, when the switch 218 is configured to route the output of the OR gate 216 to the second input 228 of the first conditioner 222, the first conditioner 222 generates a low current signal (e.g., 3.6 mA) at the output 230 when the OR gate 216 outputs a logical one or high voltage signal. Thus, when the output of the OR gate 216 indicates a failure of the sensor 104 and/or the processor 102 (by outputting a logical one), the output 230 of the first conditioner 222 is a low or a high current signal (e.g., 3.6 mA or 21.5 mA) depending on the configuration of the switch 218. On the other hand, when the output of the OR gate 216 indicates that neither of the sensor 104 or the processor 102 has failed (by outputting a logical zero), the first conditioner 222 may provide a zero current output via the output 230, present an open circuit or other high impedance condition, provide a current output via the output 230 that falls midway between the low and the high current values (e.g., 12 mA), or any other output 230 distinguishable from the low and high current values. In accordance with the teachings herein, the first conditioner 222 is implemented using discrete electronics such as logic gates, transistors, operational amplifiers, resistors, capacitors, etc., but does not employ any processor that executes instructions.

The second conditioner 224 receives an analog signal 232 from the D/A converter 206, a HART signal 234 from the HART 210, and the output 230 of the first conditioner 222. The second conditioner 224 is configured so that under normal operating conditions (i.e., neither of the sensor 104 or the processor 102 has failed and the output 230 of the first conditioner 222 is not providing the high or low current values), the analog signal 232 from the D/A converter 206 is used to generate a current signal at an output 236 of the second conditioner 224 representative of the device component position being monitored by the sensor 104. For example, the current signal may vary between 4 mA and 20 mA, corresponding to 0-100% of span for the device component. Additionally, the HART signal 234, which may contain digital communications, messages, data, etc. being sent from and to the smart process control device 100, is used to modulate (e.g., is superimposed on) the analog signal (e.g., the current signal) 232 from the D/A converter 206. Thus, under normal operating conditions, the second conditioner 224 is configured to output a modulated analog signal (e.g., 4-20 mA) that provides position information via the analog signal component of the modulated signal and contains additional data, and/or information formatted in accordance with the HART protocol.

When a failure of the sensor 104 and/or the processor 102 occurs, as noted above, the first conditioner 222 outputs a high or low current value, based on the configuration of the switch 218, and the second conditioner 222 bypasses or overrides one or both of the signals 232, 234 received from the D/A converter 206 and the HART 210. Thus, when a failure of the sensor 104 and/or the processor 102 occurs, the second conditioner 224 causes the analog signal presented at the output 230 of the first conditioner 222 to be provided at (e.g., passed through to) the output 236 of the second conditioner 224. For example, if the switch 218 is configured to route the output of the OR gate 216 to the first input 226 of the first conditioner 222, when a failure occurs the first conditioner 222 outputs a high current signal (e.g., 21.5 mA) and the second conditioner 224 also provides the high current signal at the output 236. In the case where the sensor 104 has failed but the processor 102 remains operative, the second conditioner 224 may be configured to continue to modulate the HART signal 234 onto the analog signal so that the output 236 of the second conditioner 224 includes the sensor failure indication by way of the high current (e.g., 21.5 mA) signal and continues to provide HART communications with the processor 102. In the case where the processor 102 has failed or both the sensor 104 and the processor 102 have failed, the second conditioner 224 is configured to replace the signals 232, 234 from the processor 102 and provide only the high current (in this example) analog signal at the output 236. Thus, by examining the output 236 of the second conditioner 224 via the communication interface 114, it is possible to determine whether only the sensor 104 has failed or if the processor 102 (and possibly the sensor 104) has failed.

In some examples, the second conditioner 224 is further configured to halt or otherwise affect one or more operations of the smart process control device 100 in response to an indication that the operational status of the processor 102 and/or the sensor 104 is/are not within the predetermined normal operating range(s). For example, when one or both of the sensor 104 and processor 102 have failed, the second conditioner 222 may respond to a failure signal (e.g., a 21.5 mA) signal at the output 230 of the first conditioner 222 by causing the operation control 225 to power down the smart process control device 100. Further, the operation control 225 reinitiates the smart process control device 100 in response to the processor 102 and/or the sensor 104 being replaced.

While an example manner of implementing the discrete logic safety system for a smart process control device 100 is illustrated in FIGS. 1 and 2, one or more of the elements, processes and/or devices illustrated in FIGS. 1 and 2 may be combined, divided, re-arranged, omitted, eliminated and/or implemented in any other way. Further, the example heartbeat monitor 108, the example sensor monitor 110, the example failure indicator 112, and/or, more generally, the example discrete logic safety system 106 of FIG. 1 may be implemented by hardware, software, firmware and/or any combination of hardware, software and/or firmware. Thus, for example, any of the example heartbeat monitor 108, the example sensor monitor 110, the failure indicator 112 and/or, more generally, the example discrete logic safety system 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example heartbeat monitor 108, the example sensor monitor 110, and/or the example failure indicator 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example discrete logic safety system 106 of FIG. 1 may include one or more elements, processes and/or devices in addition to, or instead of, those illustrated in FIGS. 1 and 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
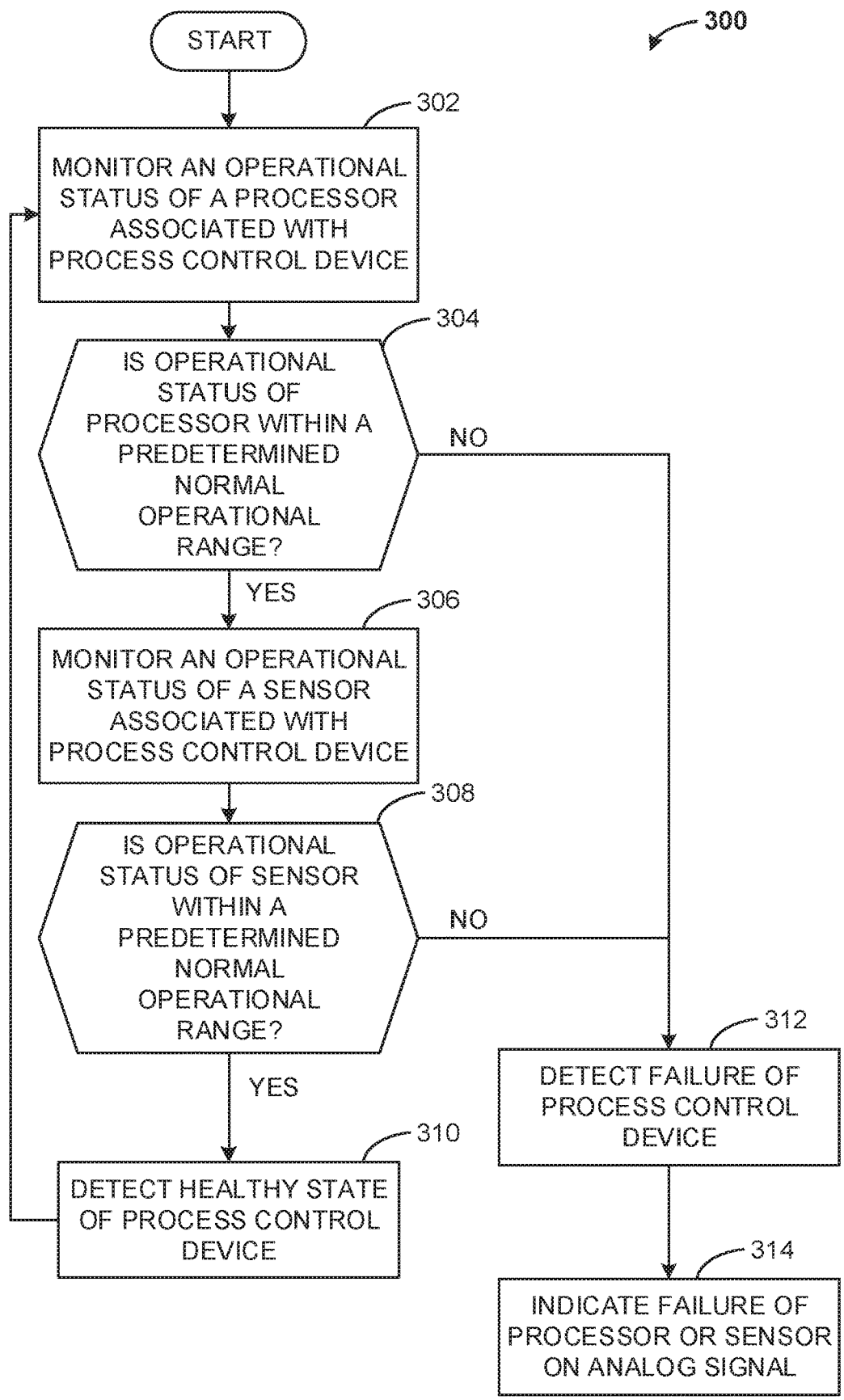
FIG. 3 is a flowchart representative of the operation of the discrete logic safety system of FIGS. 1 and 2.

A flowchart representative of example operations of the hardware logic implementing the discrete logic safety system 106 of FIGS. 1 and 2 is shown in FIG. 3. Further, although the example operations are described with reference to the flowchart illustrated in FIG. 3, many other methods of implementing the example discrete logic safety system 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a comparator, an operational-amplifier (op-amp), a logic circuit, etc.) structured to perform the corresponding operation without executing software or firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, operations, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Now turning in detail to the flowchart 300 of FIG. 3, at block 302, the heartbeat monitor 108 of the discrete logic safety system 106 monitors a condition associated with the processor 102 of the smart process control device 100. In some examples, the heartbeat monitor 108 monitors an operational status of the processor 102 such as a heartbeat signal from the processor 102, for example. In this example, the timer 214 of the discrete logic safety system 106 verifies that the heartbeat signal generator 208 of the processor 102 sends the heartbeat signal periodically. Specifically, the timer 214 implements a threshold time limit for the heartbeat signal to occur based on a predetermined normal operating frequency of the heartbeat signal generator 208.

At block 304, the heartbeat monitor 108 of the discrete logic safety system 106 determines if the operational status of the processor 102 is within the predetermined normal operating signal range. For example, the timer 214 of the heartbeat monitor 108 determines if the heartbeat signal generator 208 of the processor 102 is operating within the predetermined normal operating frequency. In some examples, if the timer 214 receives a pulse signal from the heartbeat signal generator 208 before the threshold time limit expires, the timer 214 outputs a low voltage (e.g., a logical zero) and resets as the process proceeds to block 306.

In contrast, if the threshold time limit of the timer 214 expires before receiving the pulse signal from the heartbeat signal generator 208, the timer 214 indicates that the operational status of the processor 102 is not within the predetermined normal operating signal range via a high voltage signal (e.g., a logical one) to the OR gate 216 and the process proceeds to block 312.

At block 306, the discrete logic safety system 106 monitors a condition of the sensor 104 associated with the smart process control device 100. In some examples, the discrete logic safety system 106 includes the sensor monitor 110 to monitor an operational status of the sensor 104. In some examples, the sensor monitor 110 includes the band-stop filter 212 operatively coupled to the sensor 104. In some examples, the sensor 104 includes the Hall effect sensor 202 that determines a magnetic field strength associated with a magnet(s) coupled to a moving component of the smart process control device 100. In some such examples, the band-stop filter 212 receives an analog signal from the Hall effect sensor 202 proportional to the determined magnetic field strength and, thus, the position of the moving component.

Alternatively, in some examples, the sensor monitor 110 of the discrete logic safety system 106 may monitor raw counts from an A/D converter 204 of the sensor 104. For example, the Hall effect sensor 202 sends the analog signal to the A/D converter 204 proportional to the position of the moving component of the smart process control device 100. In some examples, the A/D converter 204 converts the analog signal to digital raw counts and sends the raw counts to the D/A converter 206 of the processor 102. In some such examples, the D/A converter 206 converts the raw counts to an analog signal and sends the analog signal to the discrete logic safety system 106. In other examples, the A/D converter 204 of the sensor 104 can be operatively coupled to the discrete logic safety system 106. In some such examples, the discrete logic safety system 106 monitors a digital signal (e.g., the raw counts) from the A/D converter 204.

At block 308, the discrete logic safety system 106 determines if the operational status of the sensor 104 is within a predetermined normal operating signal range. In some examples, the band-stop filter 212 of the discrete logic safety system 106 includes a high signal threshold (e.g., a high voltage threshold, a high current threshold, etc.) and a low signal threshold (e.g., a low voltage threshold, a low current threshold, etc.) based on parameters of the predetermined normal operating signal range of the sensor 104. In some such examples, if a voltage of the signal from the sensor 104 is between the high voltage threshold and the low voltage threshold, the band-stop filter 212 outputs a low voltage (e.g., a logical zero) and the process continues to block 310. In contrast, if the voltage of the signal from the sensor 104 is above the high voltage threshold, or below the low voltage threshold, the band stop filter outputs a high voltage (e.g., a logical one) to the OR gate 216 and the process continues to block 312.

Additionally or alternatively, when the discrete logic safety system 106 monitors raw counts from the A/D converter 204 of the sensor 104, the discrete logic safety system 106 similarly includes a high raw count threshold and a low raw count threshold. Further, in some examples, if the D/A converter 206 of the processor 102 converts the raw counts of the A/D converter 204 to an analog signal, the discrete logic safety system 106 analyzes the analog signal. In some such examples, the second conditioner 224 of the discrete logic safety system 106 determines if parameters of the analog signal (e.g., a voltage, a current, a frequency, etc.) are within the predetermined normal operating signal range.

At block 310, if a first condition associated with the processor 102 and a second condition associated with the sensor 104 are within the predetermined normal operating ranges, the discrete logic safety system 106 detects a healthy state of the smart process control device 100 and the process returns to block 302. In some examples, the OR gate 216 of the discrete logic safety system 106 detects the healthy state. For example, if the OR gate 216 receives low voltage signals (e.g., logical zeros) from the band-stop filter 212 and the timer 214, the OR gate 216 outputs a low voltage signal (e.g., a logical zero).

At block 312, if the first condition associated with the processor 102 or the second condition associated with the sensor 104 are not within the predetermined normal operating ranges, the heartbeat monitor 108 and/or the sensor monitor 110 of the discrete logic safety system 106 detects a failure associated with the smart process control device 100. In some examples, the OR gate 216 of the discrete logic safety system 106 detects the failure if a high voltage signal (e.g., a logical one) is received from the band-stop filter 212 or the timer 214. For example, if the timer 214 expires without receiving the heartbeat signal from the processor 102, the timer 214 outputs the high voltage signal (e.g., the logical one) to the OR gate 216 to indicate a failure associated with the processor 102 of the smart process control device 100. Additionally or alternatively, if the band-stop filter 212 receives a voltage from the Hall effect sensor 202 above the high voltage threshold, or below the low voltage threshold, the band-stop filter 212 outputs the high voltage signal (e.g., the logical one) to the OR gate 216 to indicate a failure associated with the sensor 104 of the smart process control device 100.

At block 314, a failure indicator 112 of the discrete logic safety system 106 indicates the failure of the processor 102 or the sensor 104 via an analog signal to the communication interface 114. For example, in response to receiving the high voltage signal from the band-stop filter 212 or the timer 214, the OR gate 216 outputs a high voltage signal to the switch 218. The switch 218 outputs a signal to the first input 226 of the first conditioner 222 or the second input 228 of the first conditioner 222, based on settings determined by the user interface 220, indicating a failure associated with the smart process control device 100. Further, when the switch 218 is configured to route the signal to the first input 226, the first conditioner 222 generates a high current analog signal at the output 230 to indicate the failure to the second conditioner 224 and the second conditioner 224 provides the high current analog signal at the output 236 to the communication interface 114. In some examples, the communication interface 114 indicates if the failure originated from the processor 102 or the sensor 104 via visual indicators 116, 118 based on parameters of the output 236. Additionally, the second conditioner 224 may cause the operation control 225 to power down the smart process control device 100 in response to the failure received at the output 230.

From the foregoing, it will be appreciated that example methods, apparatus and articles of manufacture have been disclosed that enable a smart process control device to produce thorough field failure data that can be compared to a theoretical analysis of the smart process control device. More specifically, the examples described herein instrument smart process control devices with discrete logic safety systems that enable the smart process control devices to be certified using the Type A classification, thereby substantially improving serviceability of smart process control devices.

Example methods, apparatus, systems, and articles of manufacture to indicate a failure of a process control device are disclosed herein. Further examples and combinations thereof include the following:

Example 1 includes an apparatus for indicating a failure of a process control device, the apparatus comprising a heartbeat monitor to be operatively coupled to a processor of the process control device to monitor a first condition of the processor, a sensor monitor to be operatively coupled to a sensor of the process control device to monitor a second condition of the sensor, and first discrete logic operatively coupled to the heartbeat monitor and the sensor monitor to generate a failure indication associated with the process control device based on the first condition or the second condition.

Example 2 includes the apparatus of example 1, wherein the first condition is an operational status of the processor.

Example 3 includes the apparatus of example 1, wherein the second condition is an operational status of the sensor.

Example 4 includes the apparatus of example 1, wherein the sensor of the process control device is a position sensor.

Example 5 includes the apparatus of example 4, wherein the position sensor is a Hall effect sensor.

Example 6 includes the apparatus of example 1, wherein the failure indication is generated via an analog signal independent from the processor.

Example 7 includes the apparatus of example 6, wherein the analog signal replaces a first output signal from the processor.

Example 8 includes the apparatus of example 7, wherein a type of failure is determined based on a second output signal from the processor.

Example 9 includes the apparatus of example 1, wherein the process control device halts at least one function in response to the failure indication.

Example 10 includes the apparatus of example 9, wherein the process control device reinitiates in response to the processor or sensor being replaced.

Example 11 includes the apparatus of example 1, wherein the first discrete logic includes at least one of an AND gate, an OR gate, a NOT gate, a NAND gate, a NOR gate, an EXOR gate, or an EXNOR gate.

Example 12 includes the apparatus of example 1, wherein the heartbeat monitor and the sensor monitor include second discrete logic coupled to the first discrete logic.

Example 13 includes the apparatus of example 1, wherein the process control device is at least one of a process transmitter, a valve, or actuator.

Example 14 includes a method for indicating a failure of a process control device, the method comprising monitoring, via a heartbeat monitor, a first condition of a processor associated with the process control device, monitoring, via a sensor monitor, a second condition of a sensor associated with the process control device, detecting, via first discrete logic, a failure of the processor or the sensor based on the first condition and the second condition, and indicating the failure of the processor or the sensor.

Example 15 includes the method of example 14, wherein the first condition is an operational status of the processor.

Example 16 includes the method of example 14, wherein the second condition is an operational status of the sensor.

Example 17 includes the method of example 14, wherein the heartbeat monitor and the sensor monitor include second discrete logic that is coupled to the first discrete logic.

Example 18 includes the method of example 14, further including halting at least one function of the process control device in response to detecting the failure of the processor or the sensor.

Example 19 includes the method of example 14, wherein indicating the failure of the processor or the sensor includes generating an analog signal independent from the processor.

Example 20 includes an apparatus to indicate a failure of a process control device, comprising first means for monitoring to identify a first condition of a processor of the process control device, second means for monitoring to identify a second condition of a sensor of the process control device, means for identifying a failure based on the first condition or the second condition, and means for indicating to, when the first condition or the second condition is not met, halt at least one function of the process control device.

Example 21 includes the apparatus as defined in example 20, wherein the means for identifying is to identify if an operational status of the process control device is outside a predetermined functional range using discrete logic.

Example 22 includes the apparatus as defined in example 21, wherein the means for indicating is to indicate that the operational status of the process control device is outside the predetermined functional range.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for indicating a failure of a process control device, the apparatus comprising:
   a heartbeat monitor to be operatively coupled to a processor of the process control device to monitor a first condition of the processor;
   a sensor monitor to be operatively coupled to a sensor of the process control device to monitor a second condition of the sensor; and
   first discrete logic operatively coupled to the heartbeat monitor and the sensor monitor to generate a failure indication associated with the process control device based on the first condition or the second condition.

2. The apparatus of claim 1, wherein the first condition is an operational status of the processor.

3. The apparatus of claim 1, wherein the second condition is an operational status of the sensor.

4. The apparatus of claim 1, wherein the sensor of the process control device is a position sensor.

5. The apparatus of claim 4, wherein the position sensor is a Hall effect sensor.

6. The apparatus of claim 1, wherein the failure indication is generated via an analog signal independent from the processor.

7. The apparatus of claim 6, wherein the analog signal replaces a first output signal from the processor.

8. The apparatus of claim 7, wherein a type of failure is determined based on a second output signal from the processor.

9. The apparatus of claim 1, wherein the process control device halts at least one function in response to the failure indication.

10. The apparatus of claim 9, wherein the process control device reinitiates in response to the processor or sensor being replaced.

11. The apparatus of claim 1, wherein the first discrete logic includes at least one of an AND gate, an OR gate, a NOT gate, a NAND gate, a NOR gate, an EXOR gate, or an EXNOR gate.

12. The apparatus of claim 1, wherein the heartbeat monitor and the sensor monitor include second discrete logic coupled to the first discrete logic.

13. The apparatus of claim 1, wherein the process control device is at least one of a process transmitter, a valve, or actuator.

14. The apparatus of claim 1, wherein a failure of the sensor is detected in response to the second condition being greater than a first threshold or less than a second threshold.

15. A method for indicating a failure of a process control device, the method comprising:
   monitoring, via a heartbeat monitor, a first condition of a processor associated with the process control device;
   monitoring, via a sensor monitor, a second condition of a sensor associated with the process control device;
   detecting, via first discrete logic, a failure of the processor or the sensor based on the first condition and the second condition; and
   indicating the failure of the processor or the sensor via an analog signal independent from the processor, the analog signal replacing a first output signal of the processor.

16. The method of claim 15, wherein the first condition is an operational status of the processor.

17. The method of claim 15, wherein the second condition is an operational status of the sensor.

18. The method of claim 15, wherein the heartbeat monitor and the sensor monitor include second discrete logic that is coupled to the first discrete logic.

19. The method of claim 15, further including halting at least one function of the process control device in response to detecting the failure of the processor or the sensor.

20. The method of claim 15, further including indicating a type of failure based on a second output signal from the processor.

21. An apparatus to indicate a failure of a process control device, comprising:
   first means for monitoring to identify a first condition of a processor of the process control device;
   second means for monitoring to identify a second condition of a sensor of the process control device;
   means for identifying a failure based on the first condition or the second condition; and
   means for indicating to, when the first condition or the second condition is not met, halt operations performed by the process control device.

22. The apparatus as defined in claim 21, wherein the means for identifying is to identify if an operational status of the process control device is outside a predetermined functional range using discrete logic.

23. The apparatus as defined in claim 22, wherein the means for indicating is to indicate that the operational status of the process control device is outside the predetermined functional range.

* * * * *